(No Model.) 2 Sheets—Sheet 1.
F. A. GOOCH & L. WALDO.
PROCESS OF REDUCING ALUMINIUM.
No. 527,851. Patented Oct. 23, 1894.
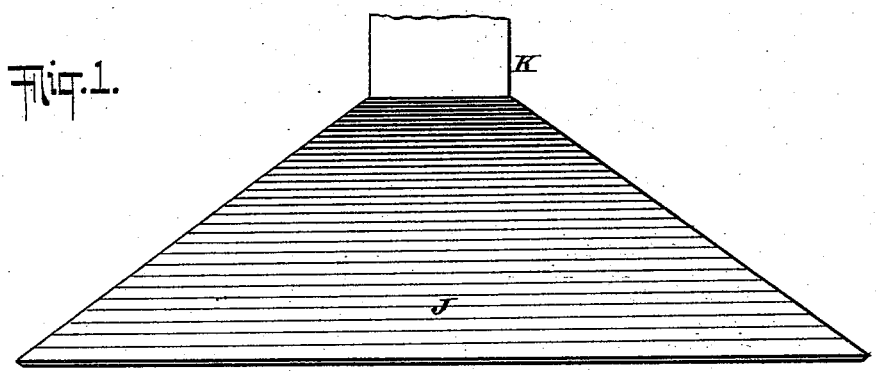
Fig. 1.
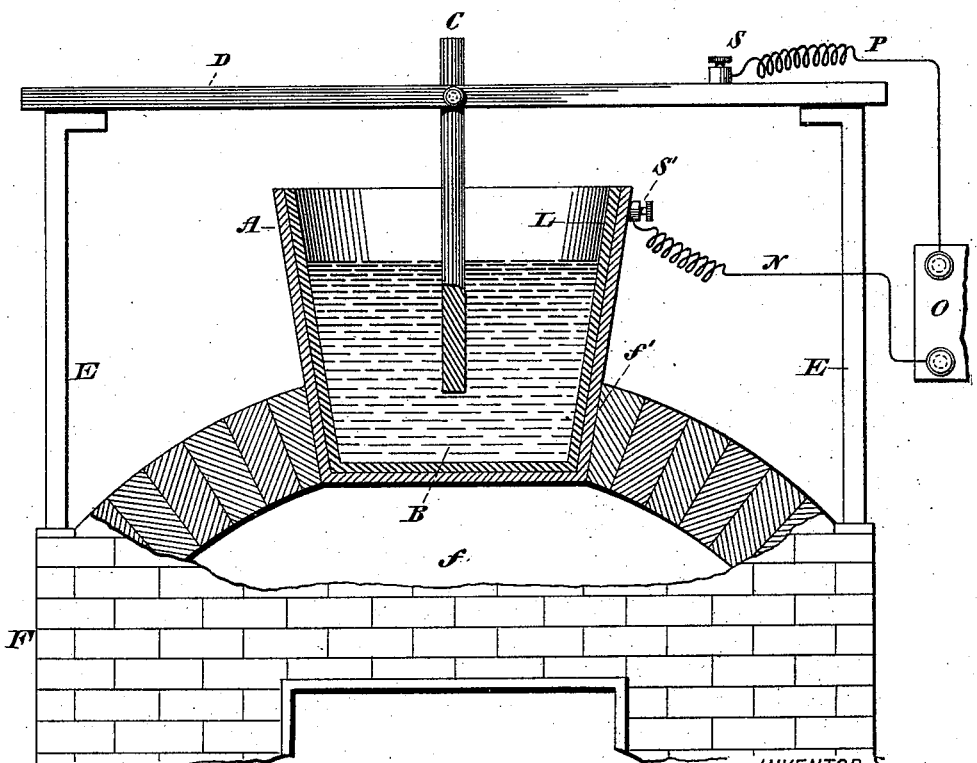
WITNESSES:
Gustave Dieterich
Joseph F. O'Brien
INVENTORS
Frank A. Gooch and
Leonard Waldo
BY
Frank L. Crawford
ATTORNEY.

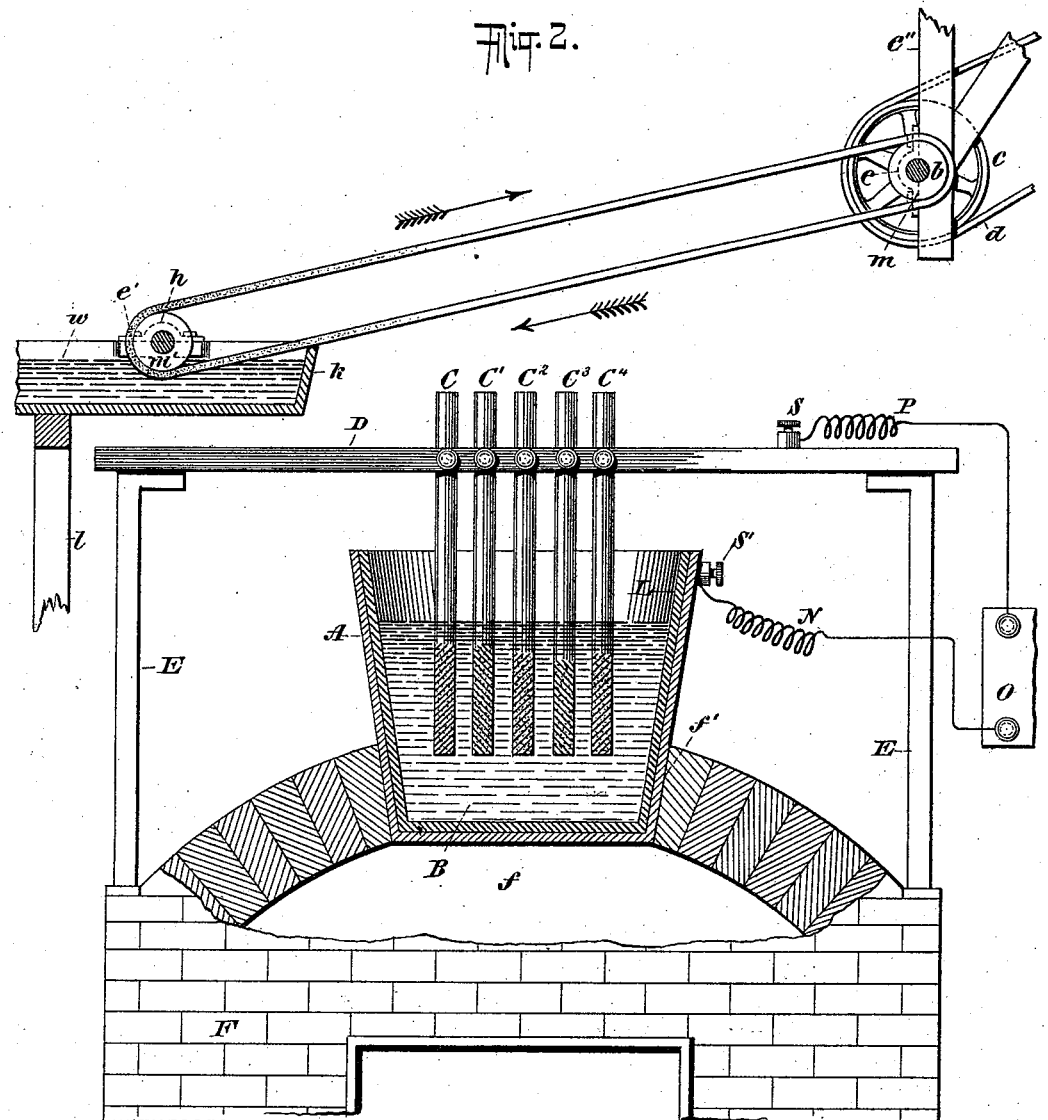

UNITED STATES PATENT OFFICE.

FRANK A. GOOCH, OF NEW HAVEN, AND LEONARD WALDO, OF BRIDGEPORT, CONNECTICUT; SAID WALDO ASSIGNOR TO THE WALDO FOUNDRY, OF NEW JERSEY.

PROCESS OF REDUCING ALUMINIUM.

SPECIFICATION forming part of Letters Patent No. 527,851, dated October 23, 1894.

Application filed July 2, 1894. Serial No. 516,258. (No specimens.)

*To all whom it may concern:*

Be it known that we, FRANK A. GOOCH, residing at New Haven, in the county of New Haven, and LEONARD WALDO, residing at Bridgeport, in the county of Fairfield, State of Connecticut, have invented certain new and useful Improvements in Processes of Reducing Aluminium; and we do hereby declare the following to be a full, clear, and exact description of the invention, such as will enable others skilled in the art to which it appertains to make and use the same.

The invention described herein relates to processes for the reduction of aluminum from its chloride by the electrolysis of a suitable fused bath containing such chloride.

The invention described herein more particularly relates to those processes for the reduction of aluminum from its chloride by the electrolysis of a suitable fused bath containing such chloride, in which a suitable salt containing water in combination is added to the bath, whereby, when the salt is decomposed, hydrogen contained in the water is made to unite with the halogens liberated by the electrolysis.

In general terms, our invention comprises an improved process of reducing aluminum from its chloride which consists in passing an electric current through a suitable fused bath containing the chloride of aluminum, thereby electrolyzing the bath, and in adding to the bath a suitable hydrous chloride of aluminum.

We preferably employ in our process a hydrous chloride of aluminum into whose composition water enters in a considerable degree.

We find the hydrous crystalline chloride of aluminum (represented by the formula $Al_2Cl_6 12H_2O$) a very excellent salt for use in our process, and we shall for convenience describe our invention with reference to the use of this salt, which is well known and easily obtainable, admits of being handled freely without special precautions, and contains a large proportion of water in its composition. It is to be understood, however, that our description is in substance applicable to the use of any suitable compound of aluminum with chlorine which is sufficiently hydrated to make it effective in our process. The hydrous chloride of aluminum beside being otherwise suitable for use in our process, has the great advantage that the chloride of aluminum contained in the salt supplies aluminum to replenish the bath, while the combined water in the salt when decomposed furnishes the hydrogen necessary in our process. In the use of other salts or substances containing water in combination, we have found it necessary in order to replenish the bath to add suitable quantities of the chloride of aluminum, separately from the salt which is added for the purpose of supplying hydrogen.

In the process herein described, the two objects are accomplished at one time by adding a suitable hydrous chloride of aluminum.

In the accompanying drawings, which are hereby made a part of this specification, is shown one form of apparatus suitable to the practice of our invention. We do not, however limit ourselves to the apparatus shown, since any other suitable apparatus would answer equally well for the practice of our invention.

Figure 1 represents a sectional diagrammatic view of the apparatus employed by us. Fig. 2 represents a sectional view of a modified form of apparatus employed by us.

Similar letters refer to similar parts throughout the drawings.

F is a furnace having a fire box $f$, and opening $f'$ in the top of the furnace, into which is set a tapering crucible A, the same being supported by the sides of the opening $f'$.

The construction of the crucible and the arrangement of the electrodes and conductors are fully described hereinafter.

$s$ $s'$ are binding posts for the conductors N, P.

B is the bath contained in the crucible A, through which the electric current is passed.

In the practice of our invention, we preferably prepare a bath by fusing in a suitable tank or crucible A, and in proper proportions, the chloride of aluminum and the chloride of an alkaline metal, preferably sodium, with the fluoride of aluminum and the fluoride of sodium. A convenient way to form a suitable bath is to combine the double chloride of aluminum and sodium (represented by the formula $2NaClAl_2Cl_6$) with the mineral cryolite. We find it of advantage to add to the combination just named an additional amount of chloride of sodium in excess of the amount necessary to form the double chloride. These ingredients are preferably mingled together in the following proportions: the double chloride of aluminum and sodium, fifteen parts; cryolite, fifty-five parts; sodium chloride, thirty parts; but these proportions are variable serviceably within wide limits, without materially affecting the operation or function of the bath, as, in fact, any proportions which may be found suitable may be employed.

The reason for employing cryolite or the fluorides of aluminum and sodium in the bath is the well known fact that, when they are present and electrolysis takes place, the aluminum melts and flows to globules, while, when the bath contains only the chlorides named, the aluminum is obtained in the form of a powder, which has to be further treated before it can be made commercially available. The object of adding the excess of sodium chloride to the bath is to make the bath more liquid. It is also advantageous in diluting the cryolite. It is not, however, essential to our invention that the excess of sodium chloride should be present; nor that the cryolite, or fluorides of aluminum and sodium, should form part of the bath, when the chlorides already mentioned are present. Indeed, our invention herein described is applicable to any bath containing the chloride of aluminium and any other suitable ingredients which will permit or enable the bath to fuse at a sufficiently low temperature, and will admit of the chloride of aluminum being decomposed in the electrolysis of the bath. Instead of forming the double chloride of aluminum and sodium separately, and then adding it to the bath, it will be sufficient to place the chloride of aluminum in the bath, and then to add chloride of sodium in such quantity that part of it may unite chemically with the chloride of aluminum to form the double chloride, while the remainder forms the excess of sodium chloride needed for the bath above described, or the order of introduction of the sodium chloride and aluminum chloride may be reversed, the sodium chloride being added first. Usually this will be found preferable, as the chloride of aluminum is very volatile until brought in contact with the sodium chloride. In place of the excess of sodium chloride, we may employ a certain proportion of chloride of potassium (which is useful in making the bath more fluid), or of some other of the alkaline metals. In case of any such substitution in the ingredients of the bath, the proportions of all the ingredients used are suitably readjusted if necessary.

For example, if the chloride of potassium be used, the ingredients are preferably mingled together in the following porportions: cryolite, fifty-five parts; chloride of aluminum, twelve parts; chloride of sodium, nineteen parts; chloride of potassium, fourteen parts; but these proportions are variable serviceably within considerable limits, without materially affecting the operation or function of the bath, as, in fact, any proportions which may be found suitable may be employed.

The crucible A preferably employed by us in the operation of our invention consists of a tank of iron, lined with compacted carbon. The carbon lining L of this tank serves as the cathode, the iron of the tank being connected by the conductor N with the negative pole of a dynamo-electric machine or other suitable source of electricity. The anode C is a detached carbon electrode partly immersed in the bath B and connected in the following manner with the source of electricity. We preferably suspend the anode C from an iron bar D raised above the crucible and resting on wooden supports E E. The bar D is connected by the conductor P to the positive pole of the source of electricity. If desired, the cathode may also be formed of a detached carbon suspended in a similar way to that just described for the anode, or otherwise supported, and partially immersed in the bath.

If desired, a number of separate carbons may be used to form the electrodes as shown in Fig. 2, where C, C', $C^2$, $C^3$ and $C^4$, all suspended from the bar D, collectively form the anode, the relative superficial areas of the electrodes in any particular case being adjusted so as to secure the greatest economy in action. In place of a carbon anode, an anode of any other suitable material, as of platinum, may be used.

The bath may be fused and the fusion may be maintained by the application of heat from any suitable source, as externally from a surface F. The temperature required to fuse the baths suggested above is that of a dull red heat. We may also fuse the ingredients of the bath in a separate apparatus, and introduce the same in a molten condition into the tank at the beginning of the process, the fusion being thereafter maintained in any suitable way. When the electric current is passed through the bath and electrolysis takes place, aluminum is deposited at the cathode, and the halogens (chiefly chlorine) are liberated at the anode. It is well known that these gases, in a free state, are highly noxious to health. On this account, and for the further reason that they attack and quickly destroy the positive electrode in the apparatus used in any process similar to the one described, their escape in a free state would render such process commercially useless. To obviate these difficulties, and to accomplish other desirable results, we add to the bath from time to time suitable quantities of hydrous crystalline chloride of aluminum ($Al_2Cl_6 12H_2O$). This salt, being decomposed in the bath, the aluminum contained in the salt replenishes the bath as hereinafter more fully stated and the hydrogen derived from the water of crystallization in the salt combines with the halogen elements liberated by the electrolysis, which then escape at the anode in the form of hydrochloric or hydrofluoric acid (chiefly the former). These gases, in the quantities evolved in our process, are easily controlled and disposed of, without injury to apparatus or workmen by appropriate means external to the bath as by the use of a flue K, having a strong draft and provided with a hood J projecting over the crucible A; or cloths saturated with water may be suspended over the crucible, the escaping gases being taken up by the water, whose extraordinary power of acting as a solvent for hydrochloric and hydrofluoric acids is well known. Such an arrangement is shown in Fig. 2, where $a$ represents an endless band or apron of cloth or other suitable fabric, passing over drums $m$ $m'$ attached to shafts $b$, $h$. The shaft $b$ revolves in journal boxes $e$ and is supported in any suitable manner, as by a strip $e''$ suspended from the ceiling. The shaft $h$ revolves in boxes $e'$ formed on the edges of the trough $k$. The shafts and band or apron $a$ are kept in revolution in the direction indicated by the arrows by power from any suitable source transmitted by the belt $d$, passing over the pulley $c$, which is rigidly attached to the shaft $b$. The shaft $b$ is hung somewhat higher than the shaft $h$. The drum $m'$ on shaft $h$ runs close to or under the surface of water $w$ contained in a shallow pan or trough $k$, having suitable support $l$. The band or apron $a$ being inclined passes through the water $w$ at the lower side of the drum $m'$ and is thus kept saturated with water. Thus saturated it passes continuously over the crucible.

In the practical operation of our invention, where we use the suggested bath composed of the double chloride of aluminum and sodium and the fluoride of aluminum and sodium, with or without an excess of chloride of sodium, we have found that we obtain at the anode hydrochloric acid almost exclusively, with very little trace of fluorine. This indicates that the aluminum deposited at the cathode is derived chiefly from the chloride of aluminum in the bath. We have found that, by the addition from time to time of the chloride of aluminum contained in the hydrous chloride of aluminum employed in the process, the bath will be replenished and the process will be a substantially continuous one through a considerable period of time. We preferably add the hydrous chloride of aluminum to the bath gradually in quantities sufficient to prevent the escape of free halogens, but a moderate excess of the same does no harm.

We have spoken of fluorine being set free, though we are aware that it is considered very difficult to isolate this element. We, however, use the word fluorine merely for convenience, meaning thereby to include not only free fluorine, if any be liberated, but also any compound thereof which might be set free at the anode, if hydrogen were not supplied to the bath during the process.

As before stated, the aluminum is deposited at the cathode, where it melts forming globules, which (when either of the suggested baths whose proportions are herein given is used), gather at the bottom of the bath, the aluminum having a higher specific gravity than the fused bath. The aluminum may then be removed in any suitable or convenient manner, as for example by means of a ladle lined and covered with carbon, or by drawing it off through a suitable opening at the bottom. In case a bath should be used whose specific gravity is higher than that of aluminum, the aluminum would of course rise to the top, where it could be easily removed.

In the process herein described, we use an electric current of suitably low electro-motive force, usually of from four to ten volts, but the voltage of the current required will depend on the size and form of the electrodes, as well as on the composition of the bath, it being only necessary to have a voltage sufficient to effect the decomposition of the chloride of aluminum in the bath, under all the existing conditions of resistance, and of chemical constitution. The electric current which we employ in our process, and which is herein referred to as being passed through the bath, is employed solely for purposes of electrolysis. The hydrous chloride of aluminum from the decomposition of which the hydrogen is obtained for our process may in the first instance be introduced into the bath before or after the electric current is passed through the same or simultaneously therewith, the order of operations being unimportant.

It being possible to form a large number of different baths, to which our invention would be applicable, we do not limit ourselves to the use of any particular bath which has been described herein. In the process herein described, there is likely to be some oxidation of the anode, if the material of the anode is oxidizable; but, unless such material is very easily oxidizable, the waste of the anode would usually be much less than if the anode were exposed to the action of the free halogens.

Having described our invention, what we claim, and desire to secure by Letters Patent, is—

1. As an improvement in the art of manufacturing aluminum, the herein described process, which consists in passing an electric current through a suitable fused bath containing the chloride of aluminum, and adding to the bath a suitable hydrous chloride of aluminum, substantially as and for the purposes set forth.

2. As an improvement in the art of manufacturing aluminum, the herein described process, which consists in passing an electric current through a suitable fused bath containing the chloride of aluminum, and adding to the bath the hydrous crystalline chloride of aluminum, substantially as and for the purposes set forth.

3. As an improvement in the art of manufacturing aluminum, the herein described process, which consists in passing an electric current through a suitable fused bath containing the chloride of aluminum and the chloride of an alkaline metal, and adding to the bath a suitable hydrous chloride of aluminum, substantially as and for the purposes set forth.

4. As an improvement in the art of manufacturing aluminum, the herein described process, which consists in passing an electric current through a suitable fused bath containing the chloride of aluminum and the chloride of an alkaline metal, and adding to the bath the hydrous crystalline chloride of aluminum, substantially as and for the purposes set forth.

5. As an improvement in the art of manufacturing aluminum, the herein described process, which consists in passing an electric current through a suitable fused bath containing the chloride of aluminum and the chloride of sodium and adding to the bath a suitable hydrous chloride of aluminum, substantially as and for the purposes set forth.

6. As an improvement in the art of manufacturing aluminum, the herein described process, which consists in passing an electric current through a suitable fused bath containing the chloride of aluminum and the chloride of sodium and adding to the bath the hydrous crystalline chloride of aluminum, substantially as and for the purposes set forth.

7. As an improvement in the art of manufacturing aluminum, the herein described continuous process which consists in forming a bath by fusing the chloride of aluminum and the chloride of an alkaline metal with the fluoride of aluminum and the fluoride of sodium, passing an electric current through the fused mass, and in adding to the bath from time to time a suitable hydrous chloride of aluminum, substantially as and for the purposes set forth.

8. As an improvement in the art of manufacturing aluminum, the herein described continuous process, which consists in forming a bath by fusing the chloride of aluminum and the chloride of an alkaline metal with the fluoride of aluminum and the fluoride of sodium, passing an electric current through the fused mass, and in adding to the bath from time to time the hydrous crystalline chloride of aluminum, substantially as and for the purposes set forth.

9. As an improvement in the art of manufacturing aluminum, the herein described continuous process, which consists in forming a bath by fusing the chloride of aluminum and the chloride of sodium with the fluoride of aluminum and the fluoride of sodium, passing an electric current through the fused mass, and in adding to the bath from time to time a suitable hydrous chloride of aluminum, substantially as and for the purposes set forth.

10. As an improvement in the art of manufacturing aluminum, the herein described continuous process which consists in forming a bath by fusing the chloride of aluminum and the chloride of sodium with the fluoride of aluminum and the fluoride of sodium, passing an electric current through the fused mass, and in adding to the bath from time to time the hydrous crystalline chloride of aluminum, substantially as and for the purposes set forth.

11. As an improvement in the art of manufacturing aluminum, the herein described continuous process which consists in fusing together the chlorides of aluminum, sodium and potassium, and the fluorides of aluminum and sodium, passing an electric current through the fused mass, and in adding to the bath from time to time a suitable hydrous chloride of aluminum, substantially as and for the purposes set forth.

12. As an improvement in the art of manufacturing aluminum, the herein described continuous process which consists in fusing together the chlorides of aluminum, sodium and potassium, and the fluorides of aluminum and sodium passing an electric current through the fused mass, and in adding to the bath from time to time the hydrous crystalline chloride of aluminum, substantially as and for the purposes set forth.

FRANK A. GOOCH.
LEONARD WALDO.

Witnesses as to Frank A. Gooch:
SARAH W. GOOCH,
MARY A. WYMAN.

Witnesses as to Leonard Waldo:
JOSEPH F. O'BRIEN,
CHAS. B. FORREST.